United States Patent [19]
Livingston et al.

[11] Patent Number: 5,198,607
[45] Date of Patent: Mar. 30, 1993

[54] LASER ANTI-MISSILE DEFENSE SYSTEM

[75] Inventors: Peter M. Livingston, Palos Verdes Estates; Alvin D. Schnurr, Los Angeles, both of Calif.

[73] Assignee: TRW Inc., Redondo Beach, Calif.

[21] Appl. No.: 836,484

[22] Filed: Feb. 18, 1992

[51] Int. Cl.$^5$ .................. F41B 15/00; F41H 11/00; F41H 13/00
[52] U.S. Cl. .................................................. 89/1.11
[58] Field of Search ..................................... 89/1.11

[56] References Cited

U.S. PATENT DOCUMENTS

| | | | |
|---|---|---|---|
| 3,427,611 | 2/1969 | Enenstein | 343/6 R |
| 3,727,223 | 4/1973 | O'Meara | 343/7.5 |
| 3,731,103 | 5/1973 | O'Meara | 250/203.2 |
| 3,875,534 | 4/1975 | Haven | 340/190 |
| 3,946,233 | 3/1976 | Erben et al. | 89/1.11 |
| 4,215,936 | 8/1980 | Winocur | 356/5 |
| 4,395,616 | 7/1983 | Smith et al. | 219/121.6 |

FOREIGN PATENT DOCUMENTS 2727610 1/1979 Fed. Rep. of Germany.

*Primary Examiner*—David H. Brown
*Attorney, Agent, or Firm*—R. M. Goldman; S. L. Goldstein

[57] ABSTRACT

An attack missile is disabled during its travel through atmospheric regions, enroute to a selected target, by directing, with the aid of a pointer tracker, a first continuous wave laser beam produced by a chemical laser from a first location through the atmosphere onto a given area of the missile to release radiant heating energy in the given area; and simultaneously directing, with the aid of another pointer tracker, a second continuous wave laser beam produced by a second chemical laser from a second location through the atmosphere onto the same given area of the missile to release radiant heating energy in the given area. The beams are arranged so that there is no material overlap between the laser beams enroute to the missile. Over a short duration the laser beams release a combined radiant heating energy on the given area of the missile sufficient in amount to at least damage a portion of the given area of said missile, resulting in the missile's destruction.

2 Claims, 3 Drawing Sheets

LASER ANTI-MISSILE DEFENSE SYSTEM

FIELD OF THE INVENTION

This invention relates to an anti-missile system and more particularly, to a laser weapon system for destroying attacking ballistic and guided missiles.

BACKGROUND

Ballistic and guided missiles are effective high technology weapons. Employing anti-missiles in defense to shoot down ballistic or guided missiles provides, at best, only partial protection. As example, anti-missile defense systems that are radar dependent for detection and guidance have been shown to have significant drawback.

Multiple or single ballistic missiles may be launched simultaneously from sites into a prescribed trajectory toward a target and the missile or missiles are tracked by radar sensing systems that guide anti-missiles for destroying the hostile missles. A successful hit can produce missile debris that in the zone of the defense system or coming subsequent attack missiles may escape radar sensing system due to debris floating around the defense zone. A significant problem is that the anti-missile may miss the hostile missile's warhead, hitting instead another part of the missile's body. This leaves the warhead intact and a continued threat. Other shortcomings relate to controlling the timeliness of the anti-missiles' engagement with the attack missile, ensuring, for obvious reasons, that the hit, if made, occurs well out of range of the target.

Cruise and guided missiles present even greater challenges to anti-missile missile defense system. Typically such missiles travel close to the ground and follow the contour of the landscape, leaving little time to launch an anti-missile once the attacking missile is detected.

Lasers have proven to be effective in engaging and destroying hostile ballistic and guided missiles before they than can hit the target. The missile must initially be acquired by radar and the tracking transferred to an optical tracker. Once optically acquired and tracked, the system operates independently of radar. The defensive laser is not radar-dependent for tracking incoming missiles. Using infra-red type fine tracking sensor detection and aiming equipment, avoids the limitations of radar. Infra-red energy essentially travels in a straight line. It is easier to use and employ than radar. The fine track sensor performs quickly and may be readily and effectively linked to aim a laser weapon.

In areas in which atmospheric effects do not come into play, such as in outer space, the laser would be particularly effective. The use of infra-red aimed high power lasers avoids the deficiencies of the previously described radar based anti-missile system. The Laser, an acronym for light amplification by the stimulated emission of radiation, produces radiant energy, generates a beam of coherent light that follows a straight line to a target and illuminates that target. At high power levels characteristic of laser weapons, the laser beam heats the target within a short time to destructive levels.

Laser energy that strikes a missile must cause catastrophic failure. Heating a site on the missile to the point that it is sufficiently weakened, causes the missile to fall apart. By heating the missile's protective re-entry material, it is unable to withstand the re-entry forces and falls apart. In some instances the guidance system is destroyed so the missile becomes unguided. At the velocities involved, loss of guidance can also cause structural failure.

Difficulties caused by the effects of the atmosphere have been encountered in delivering to the attacking missile the required amount of laser energy to cause its destruction. The problem of directing a high energy laser beam is the formation of a diverging lens along the beam path in front of the laser as the beam moves through the atmosphere to the attack missile. This is known as "thermal blooming". It decreases the effective power that can be delivered to a site on an object in the atmosphere.

An explanation of thermal blooming resides in the heat generated immediately in the path of the laser beam. The laser radiation striking the air is converted to heat causing the air path temperature to increase. The air in the beam path expands and rises. As cross currents of air enter the beam path, they are also heated and leave the beam path on the down wind side. This changes the density of heated air, produces air expansion and encourages the influx of colder air. Changes in air density causes changes in the refractive index of the air immediately in advance of the beam path. The index of refraction of air is proportional to molecular density causing the hottest regions of the beam path to have a reduced index of refraction. Refractionive index variations create a lens effect that cause the radiation to diverge or spread out from the original direction—to bloom. Blooming progressively increases the diameter of the laser beam as it moves out from the laser generator.

By the time the laser beam strikes the incoming missile it is sufficiently diffuse and its energy is no longer sufficiently focused to heat to the required temperature levels any specific site on the missile to destroy it. Known efforts to minimize thermal blooming have been largely ineffective. One approach has been to increase the power. Higher power is ineffective to overcome the blooming effect.

Generally, chemical lasers can generate at the power necessary to bring down the missile. Chemical type lasers and the associated equipment necessary for the defense weapon are quite costly. These lasers have the advantage of being physically smaller in size and, hence, are mobile. In contrast known lasers that can deliver high power are too large to be mobile and usually used from fixed positions.

An object of the invention, therefore, is to provide a new defensive weapons system and a method to effectively destroy offensive missiles.

An additional object is to provide a high powered laser defense system that is capable of mobile mounting so that it may be more quickly deployed to different locations.

A still additional object of the invention is to provide a defense system using laser weapons of existing design to create laser beams that can be transmitted through the earth's atmosphere and yet be capable of destroying attack missiles.

A further object of the invention is to avoid or surmount thermal blooming effects limiting the effectiveness of laser weapons against distant targets as may be located within or are accessible only by going through the earth's atmosphere.

SUMMARY

In realizing the foregoing objects this invention provides a method of destroying hostile guided and ballistic missiles in flight enroute to a target through the atmosphere by generating a first laser beam from first location and simultaneously generating a second laser beam from a second location, both traveling through the atmosphere and both being focused onto a site on the missile to simultaneously release radiant heat producing energy. The spacing between the first and second locations is sufficient to preclude the laser beams from intersecting one another as they are propagated in their respective predetermined paths to the missiles. The laser beams simultaneously release a combined radiant heat producing energy on the given site of the missile sufficient to render it inoperable in the various ways previously described. The laser weapons in the system are mobile, being mounted on and operable from land or space vehicles. They can also be in more permanent locations. At least two laser generating sources are arranged in a grid or picket fence array to establish defense zones for intercepting hostile missiles entering such zones. Infra-red tracking devices or other equivalent tracking devices such as permits edge detection of the missile accurately locate the vulnerable sites on the missile where the radiant energy is to be released.

It has not been possible to control the irradiance because of the blooming effect which results in absorption and beam scattering the laser. Control of the on-target irradiance through the laser power, wave length, large telescope mirrors systems, beam jitter failed to correct for the blooming effect. The inventors discovered that generating multiple radiant energy beams from separate laser sources—to focus on the same site on a hostile missile reduces the missile "kill time." It increases the effective radiant energy applied to the attack missile. The technique overcomes the atmospheric effects that exist between the laser sources and the attack missile. This technique in combination with presently available targeting and infra-red tracking devices provides the accuracy for focusing the beams on distant fast moving hostile missiles.

The foregoing objects and advantages of the invention are made possible using the novel system and structures disclosed herein. The novel system will be more apparent to those skilled in the art upon reading the following detailed description of a preferred embodiment, taken together with the illustration shown in the accompanying drawings.

DETAILED DESCRIPTION OF THE PREFERRED EMBODIMENTS

Figure 1:
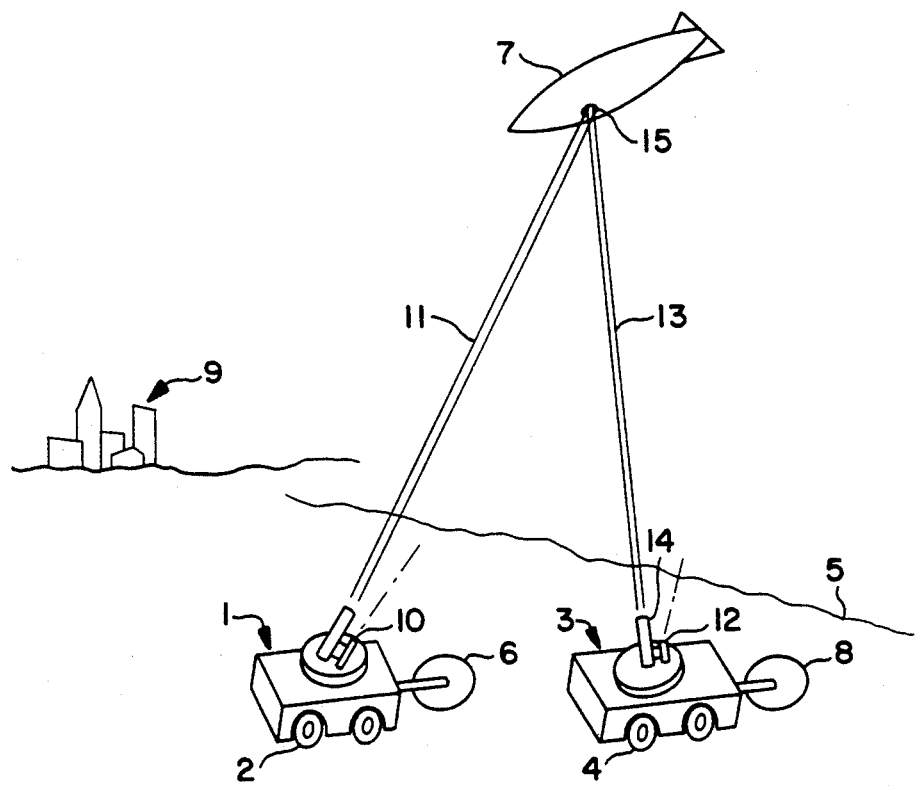
FIG. 1 pictorially represents the defense system and the process of defending against an incoming missile.

As illustrated in FIG. 1, the laser weapon system presented is formed entirely of conventional elements. Laser weapons 1 and 3, which are conventional structure and, suitably mobile as represented by vehicles 2 and 4, are positioned in the area to be defended spaced from one another, suitably a spacing within the range of one and fifty meters, along imaginary line 5 on the ground, a ground projection of a portion of the route taken by a ballistic missile 7 to the selected target, a military depot or city 9, located within the defended area. Missile 7 is in the field of view of both laser weapons. Each unit is shown as having its own acquisition radar 6 and 8 and a respective infrared type pointer tracker of conventional structure, not illustrated. It is also possible to use a single radar, spaced from either or both laser weapons, and arrange for the detected information to be sent to both laser weapons via appropriate cables or by radio transmission, not illustrated.

Figure 2:
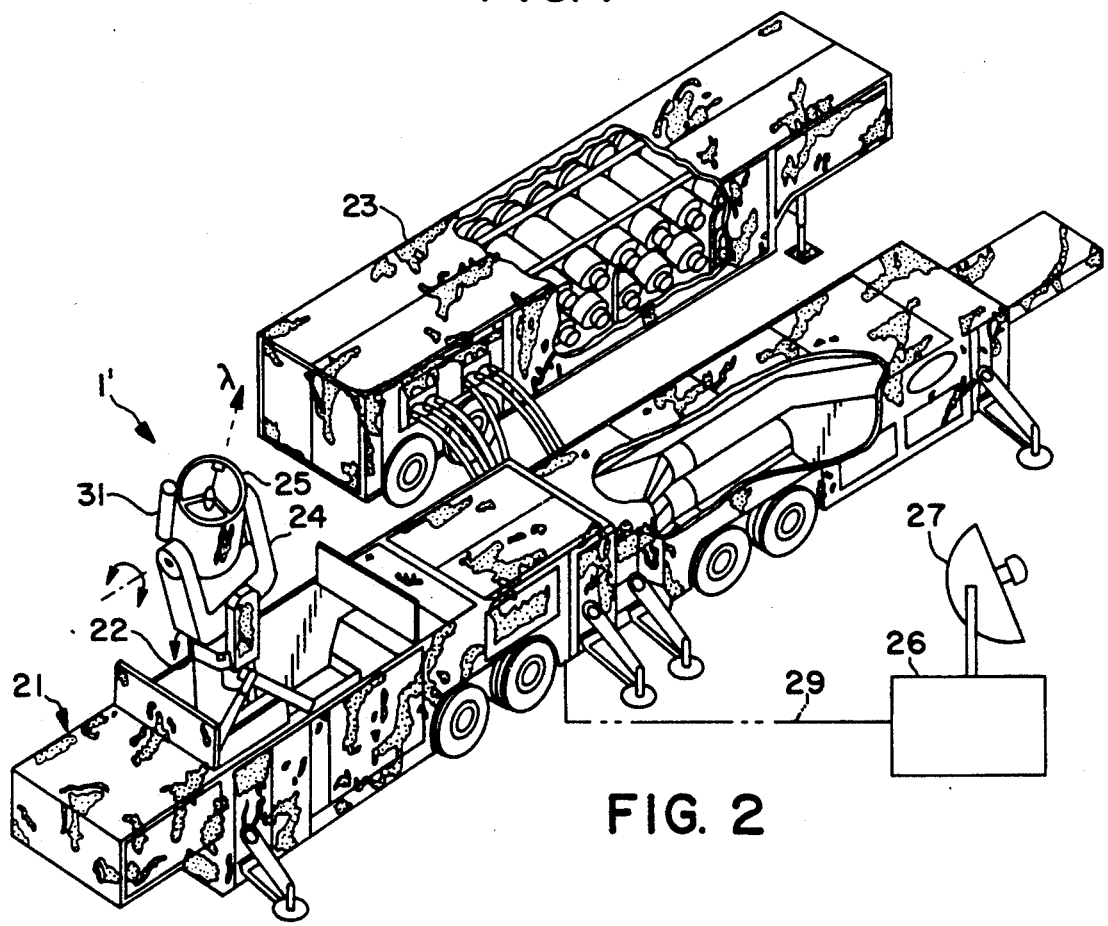
FIG. 2 is a pictorial illustration of a conventional mobile laser weapon used in the embodiment of FIG. 1.

Turning to FIG. 2, the weapon is mounted on an automotive transporter vehicle 21 that transports the weapon and its associated components to different locations as desired. A rotatably mounted base 22 carries upright supports 24 and the telescope type pointer tracker containing the laser is rotatably mounted to supports 24. By servo motor control, not illustrated, the telescope may be pointed in many directions, essentially in all attitudes and elevations over a hemisphere of space. The unit carries a power pack 23 that carried the chemical fuel for the laser 25. A radar station 26 containing radar antenna 27 is also transported as part of the weapon.

Chemical lasers are well known and will not be further discussed. They are known for high power output. The laser weapons can track with the speed of light and shoot continuously, thereby generating to a site on the missile even as it travels at supersonic speeds.

The initial detection and tracking of approaching attack missiles is carried out by known radar systems. A simple acquisition radar, represented in FIG. 2 by radar antenna 27, detects the presence of an arriving missile, typically, within two seconds of the missile's appearance in the radar range. That detection information is then "handed off," forwarded over communication path 29 to a fine track sensor 31 that is coupled to laser 25.

Typically a fine track sensor is an infrared detector and is capable of locating a target within a few arc seconds of accuracy. As the sensor and laser are mechanically linked together and both the infrared beam and laser beam essentially propagate in a straight line, with the fine track sensor aimed and maintaining that aim as the missile moves, the laser thus points directly at its acquired target.

Conventional infrared sensors use edge tracking. That is, the sensor locates the leading edge of the target, missile 7 in FIG. 1 for example, and aim is taken at a predetermined distance behind that leading edge. Infrared type pointer tracker units of the foregoing type are manufactured and sold by the Hughes Inc., El Segundo, Calif. Other details of those known devices are available in the literature.

Returning again to FIG. 1, the second laser weapon unit 3 is of like construction as unit 1, and contains radar 8, infrared sensor 12 and high power laser 14. Together the two units spaced apart are said to form a battery, picket fence array or grid array, ranging in distance from less than 1 to 25 kilometers. At least two laser units are physically close enough to hit the same missile in the same location without having the laser beam paths intersect until they reach the site 15 on the incoming missile. As illustrated the laser beam paths form two sides of a triangle whose apex occurs at site 15. The beam's diameter generated by such a telescopic apparatus are in the range of one half to one meter. Separately directed laser beams having the aforementioned diameter will readily converge at the site, the apex of the triangle, on the missile body using the conventional laser pointer-tracker equipment.

It will be appreciated that the invention is directed to defending a zone or what may be described as a space-volume against a missile attack. Space volume is defined by the base area of the defense zone and the space above it. The disposition of several laser batteries in a grid array or picket fence array will likely intercept any missiles entering the space-volume by a thousand mile sweep of the infrared detectors. Reaction time for the laser is very short. One need only activate the laser's power supply and the laser is almost ready to fire instantaneously.

The operating precision of conventionally manufactured pointer tracker units function extremely well to track hostile missiles entering the space volume. The accuracy provided by separate batteries will successfully hit the same point on the incoming missile. As those skilled in the art will recognize, other more complicated forms may be used which will gang the two tracking units with a single acquisition radar, effectively synchronizing the aiming as well as the firing of the two lasers.

With the laser battery located in between the missile launch source, or, more specifically, the anticipated direction of the missile's entry into the region, and the target region, somewhat forward of the target region, the missile must pass overhead of the battery to reach the target. The missile's entry into the volumetric area is detected within as little as two seconds. The missile is tracked by the battery's sensors and the lasers are then simultaneously fired. The lasers fire upward in a field of "regard" about ±60 degrees about the zenith times 180 degrees in azimuth. The atmosphere transmission at 3.8 μm (DF) wavelength is high in the zenith direction, around 0.8. Additionally, the beam angular rates through the air are similarly high, between 0.1 and 0.2 radians per second. These are the most favorable conditions for delivering lethal confluence (as measured in Joules/cm$^2$).

Given the two laser weapons in FIG. 1 as forming a battery, it is recognized that a number of such batteries may be placed in line to provide the desired defense system. Each of the batteries would have overlapping fields of view. A missile which enters the laser defense zones created by the battery is likely to engage the laser beams. Such engagement will cause a site on the missile surface heated for a sufficient time to melt.

Figure 3:
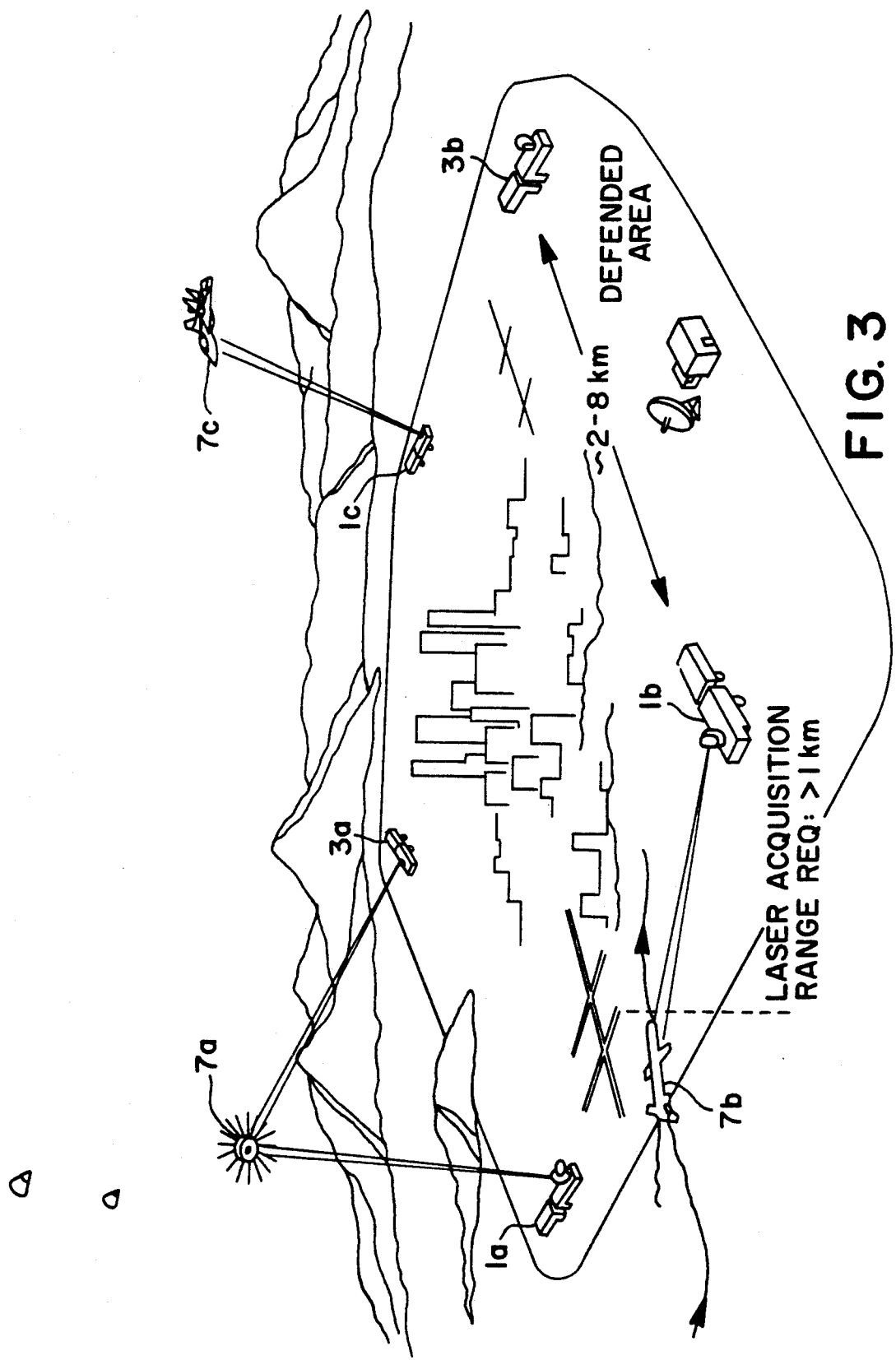
FIG. 3 illustrates a strategic defense arrangement in which quantities of the embodiment of FIG. 1 are used for greater effectiveness.

Referring now to FIG. 3, there is/shown an active defense system of laser weapons. A numeric/alpha identification is used for the same numbered elements shown in FIG. 1. Laser weapons 1a and 3a are shown beaming up to missile 7a, laser weapons 1b and 3b are shown acquiring missile 7b with weapon 1b directing a beam to missile 7b. Laser weapon 1c is shown applying a laser beam to aircraft 7c. It is clear that some of all laser weapons in the system may be individually commanded by a control system, not illustrated, to handle multiple incoming hostile missiles simultaneously in the most effective manner so as to ensure the greatest kills.

It is important for a better understanding of this invention to appreciate the thermal blooming problem. The way thermal blooming occurs and is propagated is well understood. The mechanism is explained by P. M. Livingston in the publication of Applied Optics, 10, 2, February 1971, pp 426–463. Another explanatory reference is Laser Beams in the Atmosphere, by V. E. Zuev, Plenum Press 1982, originally published in the U.S.S.R. It lists many references dealing with this problem. The Naval Research Laboratory published a paper entitled "Preliminary Study of Very High Power Laser Beams," J. N. Hayes and P. B. Ulrich (CA 1979) in which a line selected DF laser with a 70 centimeter aperture is located on the stern of an aircraft carrier in which the thermal blooming phenomenon is mentioned.

The mathematical equations (Maxwell's equations) that enable one to predict the occurrence of thermal blooming for monochromatic lasers are well developed. The cost and time involved in solving those equations is avoided by using scaling laws which serve as acceptable approximations. The scaling law relates parameters such as peak irradiance to the power and range. These laws are discussed in an article by H. Breaux, Applied Optics, 18, 15 (August 1979), pp 2638–2644.

The following scaling law equations show that there may be a peak in focused irradiance in the target plane that is a function of launched power.

$$I_p(P,z) = \left[\frac{P \cdot T(z)}{\sigma^2 z^2}\right] \left[\frac{1}{1 + C_B(\phi \cdot (P/D))^a}\right] \quad (1)$$

$$= \frac{I_{pu}}{1 + C_B(\phi \cdot P/D)^a} \quad (2)$$

The subscript p represents 'peak' and the subscript u means 'without blooming'. $C_B$ and a are constants determined by the beam shape and other physical properties, the details of which are not here relevant. $T(z)$ is the path transmittance; D is the laser telescope diameter, and $\Phi$ is a certain integral that gives the average distortion to the beam front resulting from path heating, requiring numerical evaluation, (see H. Breaux infra).

If 'a' is greater than 1.0, there is a maximum in the peak irradiance value. It turns out that 'a' depends only on the type of launched beam and varies from 1.64 for an infinite Gaussian irradiance profile to 1.177 for a uniform beam. In most practical cases a launched beam is compatible with a truncated Gaussian beam, having 'a'=1.37. This value is used in the following analysis.

Based on the foregoing, where 'a' is greater than 1.0, one may state with certainty that thermal blooming will always overwhelm focusing for some transmitted power. Thus building higher power lasers to overcome peak irradiance losses from blooming, one may conclude, appears to be a losing stragegy.

By differentiating I with respect to P, the power, in the preceding equation and setting the derivative to zero, the critical power $P_c$ is shown to be a function only of a $\Phi$ and $C_B$ as follows:

$$P_c = \left[\frac{1}{(a-1) \cdot C_B \left(\frac{\phi}{D}\right)^a}\right]^{1/a} \quad (3)$$

Remarkably, it follows from the two equations that the peak irradiance at the critical power, $P_c$, divided by the irradiance at the same power, but without thermal blooming depends only on the parameter a.

$$\frac{I_p(P_c)}{I_{pu}(P_c)} = \frac{a-1}{a} = 0.27. \tag{4}$$

Thermal blooming causes the focal spot area to increase by a factor of 3.7 as compared to the case without blooming, caused the irradiance reduction noted.

The foregoing analysis may be carried a step further by defining an enhancement factor, G, accruing when plurality of n lasers are combined to produce a given power P. For every value of launched power, a certain degree of thermal blooming occurs, as was noted in the first equation. Therefore if the power is divided between lasers, but combined on the target, the thermal blooming penalty is demonstrably less. The enhancement factor is thus taken as the ratio of the peak irradiance on the target for n lasers transmitting P power divided by the peak irradiance for a single higher power laser delivering that same power.

$$G = \frac{1 + C_B \cdot \left(P \cdot \frac{\phi}{D}\right)^a}{1 + C_B \cdot \left(P \cdot \frac{\phi}{(n \cdot D)}\right)^a} \tag{5}$$

For $P \rightarrow 0$, $G \rightarrow 1$ as is expected, but $G \rightarrow n^a$ as $P \rightarrow \infty$. That indicates that the gain for using n lasers is greater than n itself.

As example, one may consider a missile approaching a laser weapon at five kilometers ranged and 80 degrees off zenith, giving a crossing speed of approximately ten meters per second, and the laser weapon including a 800 kilowatt laser using a 1.2 meter diameter telescope, a wavelength of $3.8 \times 10^{-6}$ meters, beam quality of 1.4, curve fit parameter, $C_B$ of 0.028727, an aperture factor, m m, of 0.9166 and a second aperture factor, m2, of 0.8893 and a power law fit parameter, a, of 1.37. Thermal blooming is likely to be a dominant phenomenon under the following atmospheric conditions: a visible range of 5 kilometers, a hazy day, an absorption of about 0.02 $km^{-1}$, representing a very high humidity, a molecular absorption scale ht, hm, of 4 kilometers, an aerosol extinction scale ht, hc, of 1.5 kilometers, and assuming moderate air turbulence with a value of $10^{-14}$ $m^{-\frac{2}{3}} C_n^2$, cross wind 2.1 meters/second.

Figure 4:
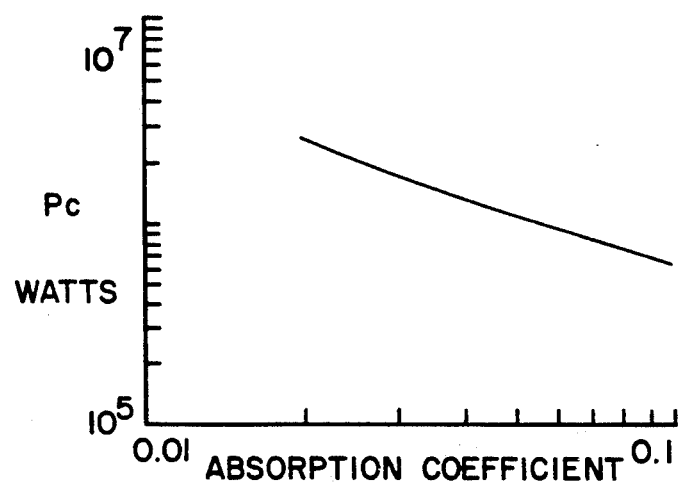
FIGS. 4, 5 and 6 are graphs that assist in explaining the theory of operation to the invention.

FIG. 4 shows how $P_c$ varies with absorption coefficient. FIG. 4 plots the absorption coefficient, $\alpha$ ($km^{-1}$), plotted along the abscissa against the critical power, $P_c$, in watts on the ordinate. As shown an order of magnitude increase in the absorption creates about an order of magnitude decrease in the critical power. A single laser with 800 kilowatts output is past the peak in the irradiance versus power curve for all absorption values greater than about 0.07 $km^{-1}$.

Figure 5:
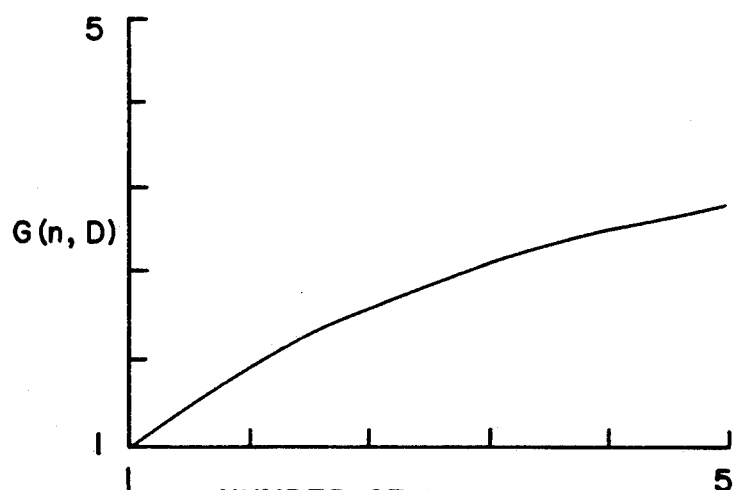

FIG. 5 plots the calculation of the Enhancement Factor, G, presented on the ordinate against the number of lasers, n, transmitting a total power of 800 kilowatts, along the abscissa. With two lasers, a doubling of enhancement is obtained. Further increases in the number of lasers used to produce the fixed power level produce less substantial increases in the enhancement factor.

For a moderate absorption value of $\alpha = 0.045$ $km^{-1}$, doubling the number of lasers increases the peak irradiance by a factor of two as shown by the a plot of the enhancement factor, G, against n presented in FIG. 5. A progressively smaller improvement follows with a greater number of lasers to produce that power P.

Figure 6:
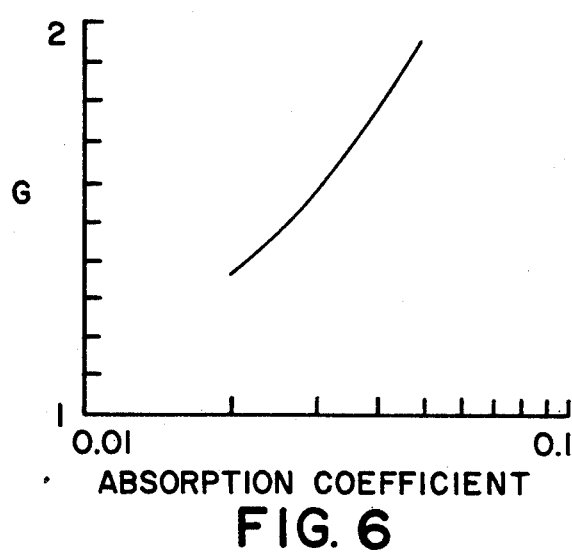

FIG. 6 shows the effect on the Enhancement factor as the absorption coefficient, $\alpha$ ($km^{-1}$), varies. At least some enhancement exists over the entire range of absorption coefficient values as indicated in the plot of G. The enhancement is at 1.4 at the lowest value of and rises to about 2 at the upper end of the plot.

The foregoing description of the preferred embodiments uses two lasers to form a laser battery. It is intended that the practice of this invention includes the use of multiple laser weapons within each battery. While the structure and method presented forms an effective defense against missiles, it may also be used on such hostile targets as aircraft.

The foregoing description provides a viable method and apparatus that is economical and does not require expensive and time consuming development of the kind incident to development of higher power lasers. It is capable of destructing tactical, guided and cruise missiles which travel at very high speeds. The method can be used against other airborne weapons as well, such as strategic bombers or fighter aircraft. Thus the term missile as used herein is intended to encompass any air or spaceborne weapon vehicle that is pilot operated or unmanned.

It is believed that the foregoing description of the preferred embodiment of the invention is sufficient in detail to enable one skilled in the art to make and use the invention. However, it is expressly understood that the details of the elements which are presented for the foregoing enabling purpose are not intended to limit the scope of the invention, inasmuch as equivalents to those elements and other modifications thereof, all of which come within the scope of the invention, become apparent to those skilled in the art upon reading this specification. Thus the invention is to be broadly construed within the full scope of the appended claims.

What is claimed is:

1. A laser anti-missile defense system for producing coherent light energy to irradiate and destroy offensive attack missiles traveling within the atmosphere, irrespective of intervening atmospheric gases characteristic of said atmosphere between said system and said missiles, comprising:

a multiple beam laser battery located on terra firma, said multiple beam laser battery comprising at least;

a first chemical laser weapon to produce a first beam of continuous wave radiant heating energy of a given power level;

a second chemical laser weapon to produce a second beam of continuous wave radiant heating energy of a given power level;

with the power levels produced by said beams of said first and second laser weapons being sufficient in combination in intensity to at least weaken a spot of the wall of a missile located at the most distant portion of the atmosphere, irrespective of any effects of thermal blooming of said beams;

said first laser weapon being spaced from said second laser weapon a predetermined distance sufficient to preclude said first and second beams from overlapping;

mounting means at each of said predetermined locations for respectively mounting said laser weapons for universal targeting movement to permit the associated laser weapon to be independently aimed at any spot within a predetermined field of view within the earth's atmosphere over essentially non-overlapping beam paths;

detecting means for detecting the presence and instantaneous position of an attack missile penetrating within said predetermined field of view for travel therethrough to provide position information on said attack missile as said missile travels within said field of view within said atmosphere;

a point tracker means responsive to said position information for pointing each of said first and second laser weapons over substantially mutually exclusive first and second paths, respectively, extending from the respective laser weapon, at a spot on said attack missile, with said spot being located at a selected position behind the leading edge of said attack missile, whereby such first and second paths do not overlap away from the immediate vicinity of such spot, and tracking said spot during movement of said attack missile, whereby such first and second paths rotationally shift with movement of said attack missile; said pointer means comprising further:

first pointer tracker means associated with said first laser weapon and second pointer tracker means associated with said second laser weapon; and firing means for simultaneously firing said first and second laser weapons to simultaneously direct continuous wave radiant heating energy from each said laser weapon to said spot on said attack missile for a predetermined duration sufficient to at least weaken said missile at said spot on said missile, whereby said missile may be destroyed.

2. The method of damaging an airborne moving target from within an atmospheric region, comprising the steps of:

directing and maintaining a first continuous wave laser beam from a chemical laser onto a given area of said target to release radiant heating energy in said given area with said first laser beam originating from said first location; and simultaneously directing and maintaining at least a second continuous wave laser beam from a second chemical laser onto said given area of said target to release radiant heating energy in said given area with said second laser beam originating from a second location spaced from said first location, said spacing between said first and second locations being in an amount sufficient to preclude said laser beams from overlapping materially with one another away from the immediate vicinity of said target, wherein said laser beams essentially define two sides of a triangle having an apex at said given area on said target; and wherein said step of directing and maintaining said first laser beam includes the step of focusing a first pointer tracker at said target to aim said first laser beam at a selected position located a distance rewardly of the forward end of said target and said step of directing and maintaining said second laser beam includes the step of focusing a second pointer tracker at said target to aim said second laser beam at said same selected position on said target at which said first laser beam is aimed;

said continuous wave laser beams releasing a combined radiant heating energy on said given area of said target sufficient in amount to at least melt or otherwise damage at least portion of said given area of said target, wherein the effect of said laser beams upon said given area is additive and results in damage to said target.

* * * * *